(12) United States Patent
Martinez Lozares

(10) Patent No.: US 8,510,965 B2
(45) Date of Patent: Aug. 20, 2013

(54) INTEGRAL MAGNETIC COMPASS FOR ESTABLISHING DEVIATIONS IN REAL TIME

(75) Inventor: Aitor Tomas Martinez Lozares, Leioa (ES)

(73) Assignee: Universidad del Pais Vasco-Euskal Herriko Unibertsitatea, Leioa (ES)

( * ) Notice: Subject to any disclaimer, the term of this patent is extended or adjusted under 35 U.S.C. 154(b) by 447 days.

(21) Appl. No.: 12/672,676

(22) PCT Filed: Aug. 8, 2008

(86) PCT No.: PCT/ES2008/000557
§ 371 (c)(1),
(2), (4) Date: Feb. 28, 2011

(87) PCT Pub. No.: WO2009/027566
PCT Pub. Date: Mar. 5, 2009

(65) Prior Publication Data
US 2011/0138641 A1    Jun. 16, 2011

(30) Foreign Application Priority Data
Aug. 9, 2007  (ES) .................................. 200702252

(51) Int. Cl.
*G01C 17/38* (2006.01)
*G01C 17/08* (2006.01)
*G01C 17/26* (2006.01)
(52) U.S. Cl.
USPC .............................. 33/364; 33/317 D; 33/356
(58) Field of Classification Search
USPC .. 33/364, 317 D, 326, 327, 356; 342/357.31; 702/153, 150
See application file for complete search history.

(56) References Cited

U.S. PATENT DOCUMENTS 3,699,658 A * 10/1972 Burns ............................. 33/346
3,888,016 A    6/1975 Fowler
(Continued)

FOREIGN PATENT DOCUMENTS

| GB | 582691 | 11/1946 |
| GB | 1416379 | 12/1975 |
| WO | WO 03/093762 | 11/2003 |

OTHER PUBLICATIONS

Supplementary European Search Report, dated Nov. 23, 2011, issued in European Patent Appl. No. 08828689.3.

(Continued)

*Primary Examiner* — Christopher Fulton
(74) *Attorney, Agent, or Firm* — Knobbe Martens Olson & Bear LLP

(57) ABSTRACT

The invention relates to an integral magnetic compass for obtaining deviations in real time, formed by a transparent sphere or cylinder (2), incorporating therein, in a hydrocarbon liquid (3), a polyester or silicon disk (4) to which the rose (5) and the magnet (6) are fitted, being associated with a commutation system formed by integrated software in a device or chip (7), the circuit of which has two inputs: an input (8) to the signal obtained from the magnetic compass (1) itself, obtained by means of a magnetometer (9) or optical reader (10) in association therewith, and another input (11) to the signal from the satellite compass (12) or from the gyroscopic compass (13), and said circuit having an output (14) to a display (15) for viewing and storage of the data for the corresponding deviations, thus obtaining the deviation chart for the magnetic needle in real time, said output being also applicable to the automatic pilot (16).

3 Claims, 1 Drawing Sheet

(56) References Cited

U.S. PATENT DOCUMENTS

| | | | |
|---|---|---|---|
| 4,027,398 A | 6/1977 | Fowler et al. | |
| 4,031,630 A | 6/1977 | Fowler | |
| 4,091,543 A | 5/1978 | Lapeyre | |
| 4,577,414 A * | 3/1986 | Migliori et al. | 33/363 K |
| 4,667,414 A * | 5/1987 | Russell | 33/364 |
| 4,848,002 A | 7/1989 | Carmona et al. | |
| 5,079,846 A * | 1/1992 | Iden | 33/364 |
| 5,131,154 A * | 7/1992 | Schierbeek et al. | 33/356 |
| 5,374,933 A * | 12/1994 | Kao | 342/357.31 |
| 5,477,470 A | 12/1995 | Lewis | |
| 6,166,686 A * | 12/2000 | Lazar | 342/357.36 |
| 2004/0093750 A1* | 5/2004 | Quinby, III | 33/364 |
| 2006/0195254 A1* | 8/2006 | Ladetto et al. | 701/207 |

OTHER PUBLICATIONS

International Search Report dated Dec. 22, 2008, issued in International Application No. PCT/ES2008/000557.

* cited by examiner

INTEGRAL MAGNETIC COMPASS FOR ESTABLISHING DEVIATIONS IN REAL TIME

RELATED APPLICATIONS

This application is a U.S. National Phase of International Application No. PCT/ES2008/000557, filed Aug. 8, 2008, designating the U.S. and published on Mar. 5, 2009 as WO 2009/027566, which claims priority to Spanish Patent Application No. P200702252, filed Aug. 9, 2007.

OBJECT OF THE INVENTION

As expressed in the title of the present specification, the invention relates to an integral magnetic compass for obtaining deviations in real time.

More specifically, the object of the invention consists of a magnetic compass, of the type applicable in any type of vessel as a navigation instrument, which is configured in an innovative manner as an integral system formed by a compass with a simplified structure incorporating a commutation system formed by integrated software capable of receiving information from the various navigation systems and contrasting it with the digital signal obtained by means of fitting a magnetometer or an optical reader to the magnetic compass, and with the signal from a satellite receiver, complying with the required properties of remanence, coercivity, sensitivity and semi-oscillation periods, achieving that the "true bearing" is offered, obtaining the deviations in real time.

FIELD OF APPLICATION

The field of application of the present invention is comprised within the sector of the nautical and sea industry in all its aspects, due to the mandatory requirement of installing magnetic compasses on board any ship or vessel.

BACKGROUND OF THE INVENTION

As is known, all ships today, regardless of their type of navigation, must have two magnetic compasses, one referred to as the master compass (housed in the binnacle) and another secondary compass.

Said master compass must be compensated with magnets with a certain measurement at least once a year, the subsequent deviation chart being prepared. The "compass bearing", to which the corresponding deviation will be applied to obtain the "magnetic bearing", is obtained from this compass, the "magnetic bearing" being affected by the terrestrial magnetic declination which, once increased or decreased, will provide the "true bearing".

The use of the gyrocompass is also well known in its application to sea navigation, specifically for obtaining the "true bearing" which has been gradually developed through the "rotation bearing" by means of a small correction by the latitude and speed of the ship, its mainly professional usefulness being due to its application to the automatic pilot.

On the other hand, the appearance of satellite systems in ships was initially used exclusively in the positioning, with a temporal offset of minutes in relation to time. Today, since it has an almost comprehensive synchronism of time, with respect to the positioning, other applications have been developed, obtaining signals from said receivers, such as "course over ground", which correspond with the angle between the geographic meridian and the line joining the points of the center of gravity of the ship on the sea bed, which is known as "course over ground".

It is therefore clear that within the satellite positioning and navigation techniques enormous developments have been made since they appeared in the application at hand. Experiments are currently being conducted with satellite compasses which offer almost absolute precision, the development of which, together with that of other systems, will make said satellite receivers an even more indispensable instrument than what they already are today, it being foreseen that in the mid-term, said equipment will replace the gyroscopic compass, but never the magnetic compass due to the autonomy of the latter.

It is therefore necessary to create an autonomous and precise navigation system which does not depend on external systems or equipment for their operation but which, however, can benefit from them, such that the data offered by the previously mentioned positioning systems in their application to navigation and more specifically to sea navigation, is limited only to one input, as is currently offered by gyrocompass and which corresponds to the "true bearing" (referred to as the "rotation bearing" or "satellite bearing"), this being the main objective of the present invention.

However, the applicant is unaware of the existence of any integral magnetic compass for obtaining deviations in real time which has technical, structural and configuration features similar to those herein proposed.

SUMMARY OF THE INVENTION

The magnetic compass proposed by the invention is thus configured in and of itself as an evident novelty within its field of application, because as a result of its creation an integral system is specifically obtained which is formed by a compass with a considerably simplified structure incorporating a commutation system by means of an external device capable of receiving information from the various navigation systems and contrasting it with the digital signal obtained, achieving that the "true bearing" is directly offered.

To that end, the invention consists on one hand of a very simplified magnetic compass with respect to the elements forming it, with respect to conventional compasses, because rather than being a conventional compass, stowed inside the binnacle, having its transverse, longitudinal magnets, the disks of the Flinders bar, Thomson spheres and the heel magnet; it is a compass which lacks the stylus and socket under the rose, further lacking internal metallic elements such as aluminums, etc., with the exception of the magnet itself, further lacking the gimbal system, because, and in a specific and characterizing manner, in the magnet proposed by the invention, the mentioned rose, with its corresponding magnet, is located inside a completely transparent sphere or cylinder made of injected transparent polycarbonates, glass or methacrylate, being arranged on a polyester, silicon or gelatin disk which, in turn, is floating in a liquid, such as a hydrocarbon or any other petroleum derivative, of either one or two different densities, which would maintain the horizontality of said rose in the center of the sphere or cylinder, in addition to preventing its freezing.

The described compass is thus completely protected so that it cannot be freely accessed.

On the other hand, the invention also comprises a commutation system formed by integrated software in a device or chip, having two inputs: one to the signal obtained from the magnetic compass itself, which will be carried out by means of a magnetometer or alternatively by means of an optical reader in association therewith, thus reducing to a minimum the electronic elements of the compass, said input being able to be integrated or not in the compass itself, whereby simplifying the system, and another input to the signal from the satellite compass or from the gyroscopic compass (as involving the same data); and having an output to a display for viewing and storage of the corresponding deviations, obtaining the deviation chart for the magnetic needle in real time, said output being able to be optionally and/or eventually applicable to the automatic pilot.

It should therefore be pointed out that an objective of the invention is the creation of an integral system capable of receiving information from the various navigation systems by means of a communications protocol such as NMEA, also being capable of contrasting the digital signal obtained by means of fitting a (non-fluxgate or non-electronic) magnetometer to the magnetic compass, with the signal from a satellite receiver.

Therefore, the invention offers the advantage not only of being able to dispense with the yearly preparation of the deviation chart required by the administrations, but rather since it obtains it in real time, the data are more accurate, in addition to assuming any decompensation due to losses of force in any of the magnets of the binnacle.

Another one of the important advances of the invention is the fact that the elimination of not only the gimbal system with its three degrees of freedom to maintain horizontality, but rather the disappearance of the internal mechanisms of current compasses, such as the stylus and the socket.

In addition, the commutation system that the compass of the invention is provided with, and more specifically the corresponding software, allows obtaining the following advantageous performances:

Developing a computerized algorithm for preparing the deviations of the magnetic needle in real time, allowing, as a result of a closed loop control system, its use in subsequent applications.

Obtaining a comparative study between different models of satellite compasses, gyroscopic compasses and magnetic compasses, interrelating the signals obtained among them.

Drawing up a program which, in compliance with the error parameters required by the various local and international administrations, is capable of assuring the suitable output signal to the automatic pilot.

Achieving a program including both the preparation of the deviation chart and the necessary signal for a certain value and its subsequent transmission through the Automatic Identification System, as well as the option of having a database containing the obtained parameters.

In summary, the integral magnetic compass for obtaining deviations in real time proposed by the invention is configured as a completely compact integral system, offering the assurance of not only the maintenance, preventing the handling by unskilled personnel, but rather the assurance of the adaptation to new satellite receiver models which may be developed in the future, depending on the global satellite navigation systems that are in service, not being restricted to one, but rather to the possible adaptation of other systems operating in open mode, such as by means of a contract, whereby assuring updating, the improvements in the elements of the circuit being easily applicable.

The new integral magnetic compass for obtaining deviations in real time therefore represents an innovative structure with structural and constitutive features unknown until now for such purpose, for which reasons, in combination with its practical use, provide it with sufficient grounds for being granted the exclusive right which is sought.

DESCRIPTION OF THE DRAWINGS

To complement the description being made and for the purpose of aiding to better understand the features of the invention, a set of drawings is attached to the present specification as an integral part thereof, in which the following is depicted with an illustrative and non-limiting character.

PREFERRED EMBODIMENT OF THE INVENTION

In view of the mentioned figures and according to the reference numbers used, a preferred embodiment of the integral magnetic compass for obtaining deviations in real time can be observed therein, which compass comprises the parts and elements indicated and described in detail below.

Figure 1:
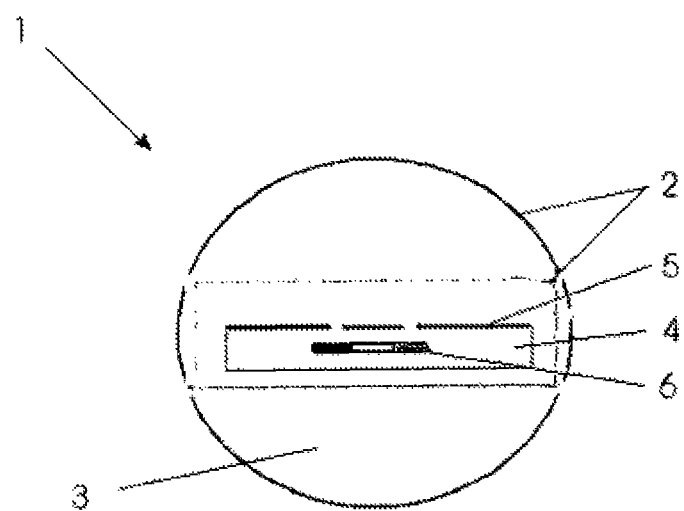
FIG. 1 shows a schematic section view of the magnetic compass object of the invention, in which the main parts and elements of which it consists, as well as the configuration and arrangement thereof, can be seen.

Therefore, as can be seen in FIG. 1, the invention consists, on one hand, of a magnetic compass (1) formed by a transparent sphere or cylinder (2), made of injected transparent polycarbonates, glass or methacrylate, incorporating therein, floating in a liquid (3), the solution of which could be of a hydrocarbon or any other petroleum derivative which prevents its freezing and maintains the horizontality of the rose (5) in its center as a result of the difference of densities, a polyester, silicon or gelatin disk (4) in which the mentioned rose (5) is incorporated, and housing therein the magnet (6) enabling its operation.

Figure 2:
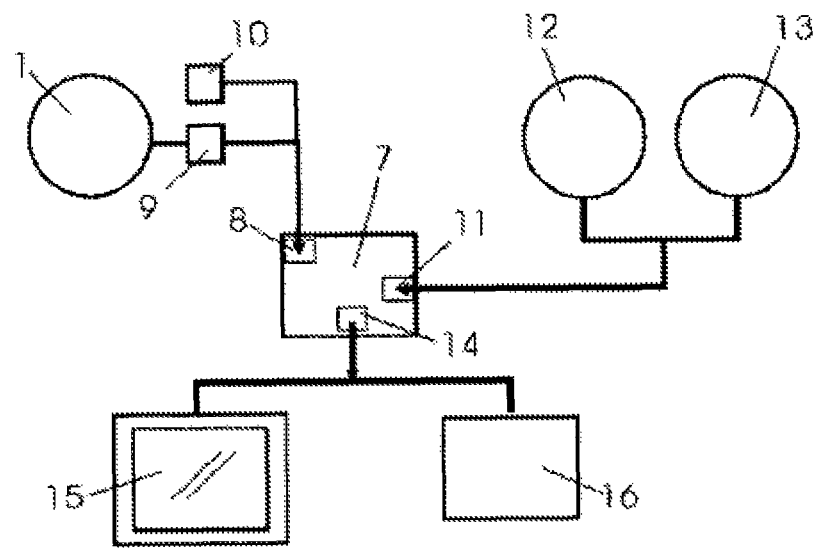
FIG. 2 shows a block diagram schematically showing the configuration of the commutation system comprised in the invention, the parts of which it consists and its connection to other elements being seen therein.

On the other hand, as seen in the diagram of FIG. 2, the invention comprises associated with said compass (1) a commutation system formed by integrated software in a device or chip (7), the circuit of which has two inputs: an input (8) to the signal obtained from the magnetic compass (1) itself, obtained by means of a magnetometer (9) or alternatively by means of an optical reader (10) associated therewith, and another input (11) of the signal from the satellite compass (12) or from the gyroscopic compass (13) (as involving the same data); said circuit having an output (14) to a display (15) for viewing and storage of the data for the corresponding deviations, obtaining the deviation chart for the magnetic needle in real time, said output being also applicable to the automatic pilot (16).

It should be pointed out that the aforementioned input (8) to the signal obtained from the magnetic compass (1) optionally may or may not be integrated in the compass (1) itself.

Having sufficiently described the nature of the present invention as well as the manner of putting it into practice, it is not considered necessary to extend its explanation so that any person skilled in the art may understand its scope and the advantages derived from it, hereby stating that within its essential character, it could be carried out to practice in other embodiments which differ in detail from the embodiment indicated by way of example, and such other embodiments will equally receive the resulting protection provided that its essential principle is neither altered nor changed nor modified.

What is claimed is:

1. Integral compass for obtaining deviations in real time, applicable in vessels, comprising:
    a magnetic compass,
    a magnetometer or optical reader for obtaining the signal from the magnetic compass, and
    a commutation system, said commutation system further comprising:

integrated software in a chip, and
a circuit with an input for the signal from the magnetic compass and another input for a signal from a satellite compass or gyroscope, wherein the magnetic compass comprises:
a transparent sphere or cylinder having a liquid derived from petroleum therein,
a disk comprising a polyester, silicon or gelatin disk and floating in the liquid,
a compass rose incorporated in the disk and
a magnet on the compass rose, and wherein, the software is capable of contrasting the input signals so as to prepare a deviation chart in real time.

2. Integral compass according to claim 1, comprising a display for viewing the deviation chart.

3. Integral compass according to claim 1, further comprising means for storing the deviation chart.

\* \* \* \* \*